(12) United States Patent
Takashi

(10) Patent No.: US 10,745,063 B2
(45) Date of Patent: Aug. 18, 2020

(54) VEHICLE REAR PORTION STRUCTURE

(71) Applicant: Toyota Jidosha Kabushiki Kaisha, Toyota-shi, Aichi-ken (JP)

(72) Inventor: Toshinobu Takashi, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 126 days.

(21) Appl. No.: 16/193,662

(22) Filed: Nov. 16, 2018

(65) Prior Publication Data
US 2019/0152536 A1 May 23, 2019

(30) Foreign Application Priority Data

Nov. 21, 2017 (JP) ................................ 2017-223371

(51) Int. Cl.
| | |
|---|---|
| *B60J 7/00* | (2006.01) |
| *B62D 25/08* | (2006.01) |
| *B60J 10/84* | (2016.01) |
| *B60J 10/27* | (2016.01) |
| *B60J 10/24* | (2016.01) |
| *B62D 25/07* | (2006.01) |
| *B62D 29/00* | (2006.01) |

(52) U.S. Cl.
CPC ............ *B62D 25/087* (2013.01); *B60J 10/24* (2016.02); *B60J 10/27* (2016.02); *B60J 10/84* (2016.02); *B62D 25/07* (2013.01); *B62D 29/008* (2013.01)

(58) Field of Classification Search
CPC .. B62D 25/087; B62J 9/20; B62J 7/04; A45C 5/14; A45C 13/262; B60N 2/305; B60N 2/3011; B60N 2/36; A45F 3/04
See application file for complete search history.

(56) References Cited

U.S. PATENT DOCUMENTS

| | | |
|---|---|---|
| 3,665,646 A | 5/1972 | Niemanns |
| 4,634,174 A | 1/1987 | Kamiya |
| 6,241,309 B1 * | 6/2001 | Roehl ................... B62D 25/087 |
| | | 296/198 |
| 6,846,037 B2 * | 1/2005 | Engels .................... B60R 19/18 |
| | | 296/187.11 |

(Continued)

FOREIGN PATENT DOCUMENTS

| | | |
|---|---|---|
| EP | 3342686 A1 | 7/2018 |
| GB | 2153420 A | 8/1985 |

(Continued)

*Primary Examiner* — Kiran B Patel
(74) *Attorney, Agent, or Firm* — Dinsmore & Shohl LLP

(57) ABSTRACT

A vehicle rear portion structure includes an upper back and an upper back reinforcement. The upper back reinforcement is made of a material different from the upper back and is provided to extend in a vehicle width direction on an upper side of a rear portion of the upper back in a vehicle front-rear direction. The upper back reinforcement includes a front flange, a rear flange, a bulging portion, and a luggage opening flange. Luggage weather rubber is attached to the luggage opening flange. The upper back is joined to the rear flange of the upper back reinforcement at a rear end portion of the upper back in the vehicle front-rear direction by any of caulking joining, bolt joining, and rivet joining. A rear side joining portion is covered with the luggage weather rubber.

6 Claims, 4 Drawing Sheets

(56) References Cited

U.S. PATENT DOCUMENTS

| | | | | |
|---|---|---|---|---|
| 7,628,446 | B2 * | 12/2009 | Harney | B62D 25/087 |
| | | | | 296/193.02 |
| 10,392,054 | B2 * | 8/2019 | Toyota | C09J 5/06 |
| 2012/0153677 | A1 * | 6/2012 | Matsuura | B62D 21/152 |
| | | | | 296/193.08 |
| 2013/0037338 | A1 * | 2/2013 | Harunari | B60K 1/04 |
| | | | | 180/68.5 |
| 2019/0002031 | A1 * | 1/2019 | Muramatsu | B62D 21/15 |

FOREIGN PATENT DOCUMENTS

| | | |
|---|---|---|
| JP | H08067219 A | 3/1996 |
| JP | 2014-080063 A | 5/2014 |
| JP | 2017-043129 A | 3/2017 |

\* cited by examiner

VEHICLE REAR PORTION STRUCTURE

CROSS-REFERENCE TO RELATED APPLICATIONS

This application claims priority to Japanese Patent Application No. 2017-223371 filed on Nov. 21, 2017, which is incorporated herein by reference in its entirety including the specification, drawings and abstract.

BACKGROUND

1. Technical Field

The present disclosure relates to a vehicle rear portion structure.

2. Description of Related Art

Japanese Unexamined Patent Application Publication No. 2017-043129 (JP 2017-043129 A) discloses a technique for joining dissimilar metals in a case where an upper back is made of aluminum, a rear skeleton provided in the rear end portion of the upper back is made of iron (made of steel), and the upper back and the rear skeleton are joined to each other. By the upper back being made of aluminum, vehicle weight reduction can be achieved as compared with a case where the upper back is made of iron.

For an increase in weight reduction rate based on the use of the dissimilar material of the upper back (use of aluminum), it is desirable that an upper back 2 is provided to extend rearward up to a luggage opening 6 (including the vicinity of the luggage opening) as illustrated in FIG. 4. However, a part connected to the luggage opening 6 is a rain gutter portion (water flow surface) 6a that can be seen when a user U opens a luggage door 7. Although dissimilar material joining techniques for joining dissimilar materials include caulking joining, bolt joining, and rivet joining, the caulking joining pushes out the material and the bolt joining and the rivet joining are performed by secondary materials being used, and thus these methods may conspicuously result in a joining place having a projecting shape or a large joining portion diameter compared to spot welding in which base materials are melted and joined.

Accordingly, in a case where the upper back 2 is provided to extend rearward up to the luggage opening 6, the dissimilar material joining portion between the upper back 2 and a surrounding member may be seen from the user U when the luggage door 7 is open, which may cause a poor appearance.

SUMMARY

The present disclosure provides a vehicle rear portion structure with which the design at a time when a luggage door is open can be further improved even in a case where an upper back is provided to extend rearward up to a luggage opening.

An aspect of the disclosure relates to a vehicle rear portion structure. The vehicle rear portion structure includes an upper back and an upper back reinforcement. The upper back reinforcement is made of a material different from the upper back and is provided to extend in a vehicle width direction on an upper side of a rear portion of the upper back in a vehicle front-rear direction. The upper back reinforcement includes a front flange, a rear flange behind the front flange in the vehicle front-rear direction, a bulging portion provided to bulge upward between the front flange and the rear flange, and a luggage opening flange provided to rise upward from a rear end portion of the rear flange in the vehicle front-rear direction and define an opening edge on a front side of a luggage room. Luggage weather rubber is provided continuously over an entire circumference of the opening edge of the luggage room, and is attached to the luggage opening flange. The upper back is joined to the front flange of the upper back reinforcement at an intermediate portion of the upper back in the vehicle front-rear direction by any of caulking joining, bolt joining, and rivet joining and is joined to the rear flange of the upper back reinforcement at a rear end portion of the upper back in the vehicle front-rear direction. A rear side joining portion as a joining portion between the upper back and the rear flange of the upper back reinforcement is covered with the luggage weather rubber. In the vehicle rear portion structure according to the aspect of the disclosure, the luggage weather rubber may include an attachment portion attached to the luggage opening flange of the upper back reinforcement and a lip extending from the attachment portion in a direction to enlarge an opening of the luggage room. The rear side joining portion may be covered with the lip of the luggage weather rubber. In the vehicle rear portion structure according to the aspect of the disclosure, a length of the lip from the attachment portion in a cross-sectional view of the luggage weather rubber may be constant over an entire circumference of the luggage weather rubber. In the vehicle rear portion structure according to the aspect of the disclosure, the length of the lip from the attachment portion may be equal to or greater than a length at which the lip reaches a vehicle front side end of the rear side joining portion and may be equal to or less than a length at which the lip reaches the bulging portion in a vehicle width direction center portion of the opening edge on the front side of the luggage room. In the vehicle rear portion structure according to the aspect of the disclosure, the upper back reinforcement may include reinforcement outside portions outside vehicle width direction ends of the upper back in the vehicle width direction in both end portions in the vehicle width direction. The upper back reinforcement may be joined by spot welding to a vehicle body member made of the same type of material as the upper back reinforcement in the reinforcement outside portion. In the vehicle rear portion structure according to the aspect of the disclosure, a plurality of the rear side joining portions covered with the luggage weather rubber may be provided in the vehicle width direction. An end of the upper back in the vehicle width direction may be between an outermost side joining portion on an outermost side in the vehicle width direction among the rear side joining portions and an adjacent spot joining portion provided at a position not covered with the luggage weather rubber at a position adjacent to the outermost side joining portion in the vehicle width direction among spot joining portions between the reinforcement outside portion and the vehicle body.

The following effects can be achieved from the aspect of the disclosure. Since the upper back is joined to the rear flange as well as the front flange of the upper back reinforcement, the upper back is provided to extend rearward up to the luggage opening (including the vicinity of the luggage opening). As a result, the weight reduction rate in a case where the upper back is made of a material lighter than the material of the upper back reinforcement can be maximized rearward unlike in a case where the upper back is joined to the front flange of the upper back reinforcement without being joined to the rear flange.

Since the rear side joining portion, which is the joining portion between the upper back and the rear flange of the upper back reinforcement, is covered with the luggage weather rubber, the rear side joining portion being seen when the luggage door is open can be suppressed. Accordingly, even in a case where the upper back is provided to extend rearward up to the luggage opening, the design at a time when the luggage door is open can be further improved.

Since the rear side joining portion is covered with the luggage weather rubber, a new part such as a garnish merely for covering and hiding the rear side joining portion is unnecessary. Accordingly, unlike in a case where a new part is added, an increase in the number of parts can be further suppressed, which is advantageous in terms of cost.

According to the aspect of the disclosure, since the rear side joining portion is covered also with the lip of the luggage weather rubber, it is possible to cover the rear side joining portion with a simple configuration as compared with a case where the rear side joining portion is covered with the attachment portion of the luggage weather rubber.

According to the aspect of the disclosure, since the length of the lip extending from the attachment portion in the cross-sectional view of the luggage weather rubber is constant over the entire circumference of the luggage weather rubber, the luggage weather rubber can be inexpensively manufactured as compared with a case where the length of the lip is different.

The following effects are also achieved through the aspect of the disclosure. It is desirable that the opening of the luggage room is large in view of improving the usability of the luggage room. Accordingly, it is desirable that the length of the rear flange of the upper back reinforcement in the vehicle front-rear direction is short, and the length is minimized in the vehicle width direction center portion of the opening edge on the front side of the luggage room. In the disclosure, the length of the lip extending from the attachment portion is set based on the vehicle width direction center portion of the opening edge on the front side of the luggage room, that is, the part where the length of the rear flange of the upper back reinforcement in the vehicle front-rear direction is minimized and is equal to or greater than the length at which the lip reaches the vehicle front side end of the rear side joining portion and equal to or less than the length at which the lip reaches the bulging portion. Accordingly, across the entire vehicle width direction area of the upper back reinforcement, (i) it is possible to further suppress the lip abutting against the bulging portion of the upper back reinforcement to be bent and cause a poor appearance and (ii) it is possible to further suppress the necessity of displacing the opening edge on the front side of the luggage room to the rear side of the vehicle in order to ensure a disposition space for the lip.

According to the aspect of the disclosure, since the upper back reinforcement is joined by spot welding to the vehicle body member made of the same type of material as the upper back reinforcement in the reinforcement outside portion, the design can be further improved unlike in a case where joining is performed by caulking joining, bolt joining, or rivet joining, which are joining methods for dissimilar materials.

According to the aspect of the disclosure, the end of the upper back in the vehicle width direction is between the outermost side joining portion, which is on the outermost side in the vehicle width direction among the rear side joining portions, and the adjacent spot joining portion, which is provided at a position that is not covered with the luggage weather rubber, and which is adjacent to the outermost side joining portion among the spot joining portions between the reinforcement outside portion and the vehicle body. Accordingly, the vehicle width direction end of the upper back can be set at the outermost side position where the rear side joining portion can be covered with the luggage weather rubber. Accordingly, in a case where the rear side joining portion is covered with the luggage weather rubber, the weight reduction rate in a case where the upper back is made of a material lighter than the material of the upper back reinforcement can be maximized in the vehicle width direction.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
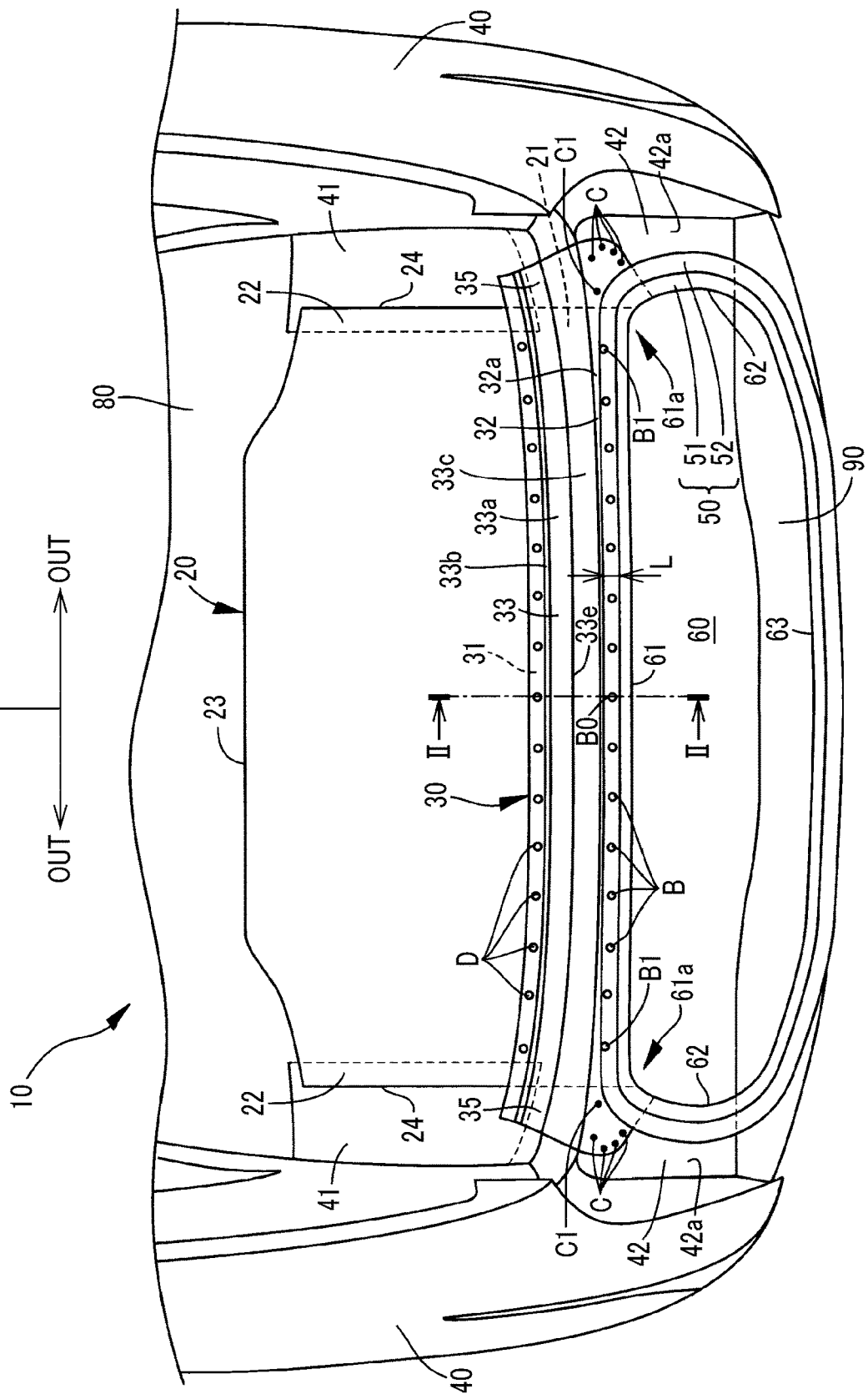
FIG. 1 is a schematic plan view of a vehicle rear portion structure according to an example of the disclosure.

Hereinafter, a vehicle rear portion structure 10 according to an example of the disclosure will be described with reference to accompanying drawings. In the drawings, UP indicates upward, FR indicates the front of a vehicle, and OUT indicates the outside in a width direction of the vehicle. Unless otherwise noted, the upper-lower direction and the front-rear direction in the following description indicate the upper-lower direction and the front-rear direction of the vehicle, respectively.

As illustrated in FIG. 1, the vehicle rear portion structure 10 according to the example of the disclosure has an upper back 20, an upper back reinforcement (hereinafter, also referred to as an upper back R/F) 30, a side member sub-assembly (hereinafter, also referred to as a side member S/A) 40, and luggage weather rubber 50.

The upper back 20 is a body part that partitions a luggage room 60 and the inside of the vehicle cabin mainly in the upper-lower direction behind the rear seat (not illustrated) of the vehicle. The upper back 20 is a plate-shaped body that has a thickness direction corresponding to the upper-lower direction and is formed in a substantially rectangular shape in plan view.

The upper back 20 is joined to the upper back R/F 30 in a rear portion 21. The rear portion 21 of the upper back 20 is a part behind the center of the upper back 20 in the front-rear direction. For example, the rear portion 21 is a rear end portion 21b of the upper back 20 in the front-rear direction and the vicinity of the rear end portion. End portions 22 of the upper back 20 in the vehicle width direction are joined to the right and left side member S/As 40, respectively. A front end portion 23 of the upper back 20 is joined to a room partition panel (not illustrated), which is a body part that partitions the luggage room 60 and the inside of the vehicle cabin mainly in the front-rear direction.

Vehicle width direction ends 24 of the upper back 20 in plan view are vehicle width direction positions that are the same or nearly the same across the entire front-rear direction area of the upper back 20. Still, the vehicle width direction positions of the vehicle width direction ends 24 of the upper back 20 in plan view may also be different in the front-rear direction of the upper back 20.

Figure 2:
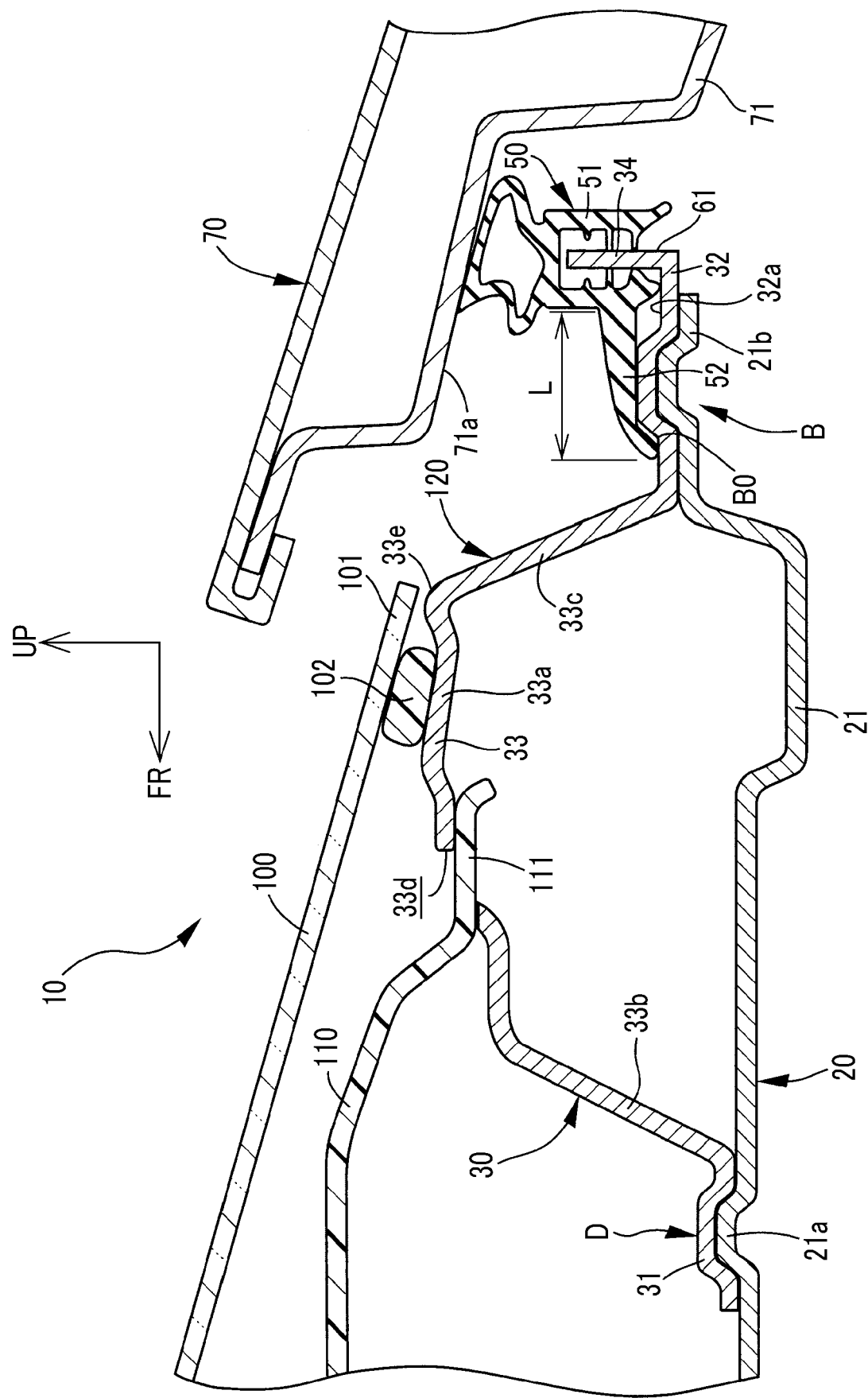
FIG. 2 is an enlarged sectional view taken along line II-II of FIG. 1.
Figure 3:
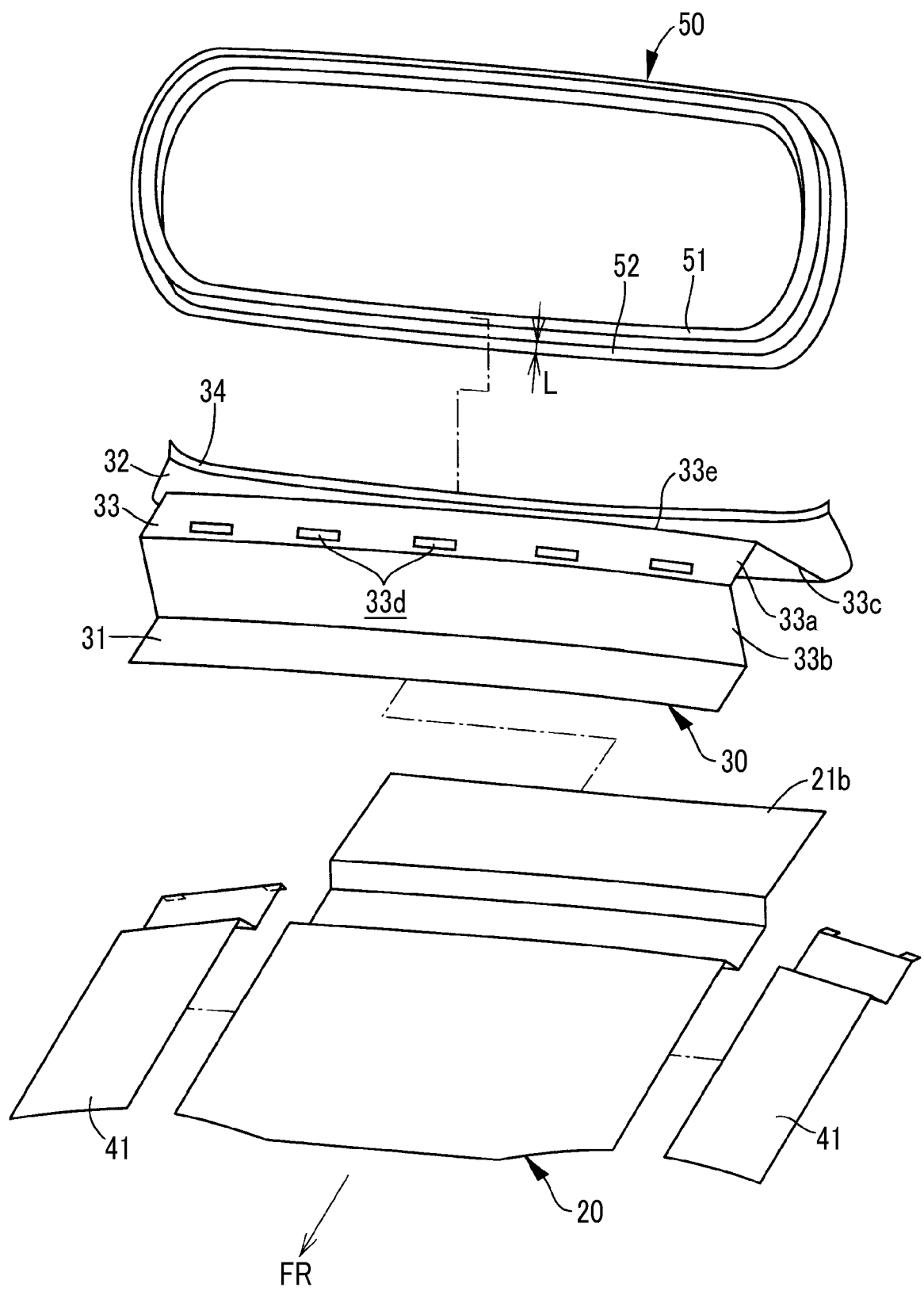
FIG. 3 is a schematic exploded perspective view of an upper back, an upper back reinforcement, luggage weather rubber, and a bracket package in the vehicle rear portion structure according to the example of the disclosure.
Figure 4:
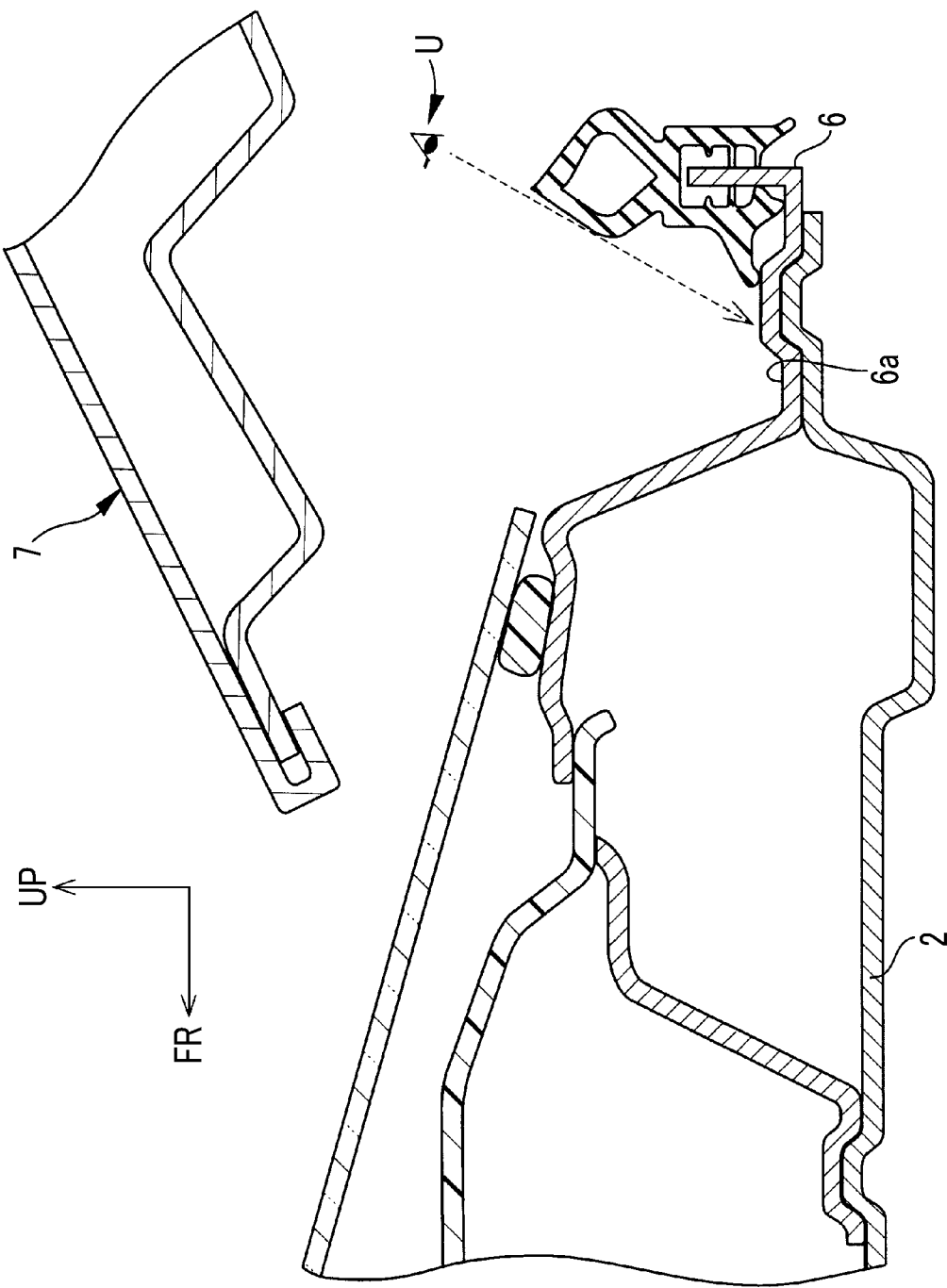
FIG. 4 is a sectional view illustrating a case where an upper back is provided to extend rearward up to a luggage opening in a vehicle rear portion structure according to the related art.

The upper back R/F 30 is provided to extend in the vehicle width direction on the upper side of the rear portion 21 of the upper back 20. The upper back R/F 30 is manufactured by a plate-shaped body being folded and bent by molding. As illustrated in FIG. 2, the upper back R/F 30 has a front flange 31, a rear flange 32 behind the front flange 31, a bulging portion 33 bulging upward between the front flange 31 and the rear flange 32 in the front-rear direction, and a luggage opening flange 34 rising upward from the rear end portion of the rear flange 32 and forming an opening edge 61 on the front side of the luggage room 60.

The front flange 31 is joined to a front-rear direction intermediate portion 21a of the upper back 20. The rear flange 32 is joined to the rear end portion 21b of the upper back 20 in a plurality of places in the vehicle width direction. The upper surface of the rear flange 32 is a front rain gutter portion (water flow surface) 32a that can be seen when a user opens a luggage door 70. Since the upper back 20 is joined to the rear flange 32 as well as the front flange 31 of the upper back R/F 30, the upper back 20 is provided to extend rearward up to the opening of the luggage room 60 (including the vicinity of the opening of the luggage room). In other words, the upper back 20 being provided to extend rearward up to the opening of the luggage room 60 means that the upper back 20 is provided to extend to the rear flange 32 of the upper back R/F 30.

The bulging portion 33 has a top plate 33a at a distance above the upper back 20, a front wall 33b extending downward from the front end of the top plate 33a to the rear end of the front flange 31, and a rear wall 33c extending downward from the rear end of the top plate 33a to the front end of the rear flange 32. Since the upper back R/F 30 has the bulging portion 33, a closed cross section portion 120, which is a closed cross section in a sectional view orthogonal to the vehicle width direction, is formed by the upper back R/F 30 and the rear portion 21 of the upper back 20 and the rigidity of the vehicle rear portion structure 10 is enhanced.

Back window glass 100 of the vehicle is placed on the top plate 33a of the bulging portion 33. A rear end portion 101 of the back window glass 100 is placed on the top plate 33a and bonded by an adhesive 102. A through hole 33d penetrating the top plate 33a in the upper-lower direction is formed in the top plate 33a of the bulging portion 33. The through hole 33d is formed in front of the position where the adhesive 102 is provided. A rear end portion 111 of an interior material 110 of the vehicle covering the upper back 20 from above and below the back window glass 100 is inserted in the through hole 33d. The interior material 110 is held by the bulging portion 33 in a state where the rear end portion 111 is inserted in the through hole 33d.

As illustrated in FIG. 1, the upper back R/F 30 has a reinforcement outside portion 35 in each end portion in the vehicle width direction. The reinforcement outside portion 35 is outside the vehicle width direction end 24 of the upper back 20 in the vehicle width direction. The upper back R/F 30 is joined to the side member S/A 40 in the reinforcement outside portion 35.

The side member S/A 40 rises upward from each side portion of a floor body 80 of the vehicle in the vehicle width direction and constitutes the right and left side portions of the body of the vehicle. The rear end portions of the right and left side member S/As 40 are joined to a lower back 90 extending in the vehicle width direction and forming an opening edge 63 on the rear side of the luggage room 60. The side member S/A 40 has a bracket package 41 to which the end portion 22 of the upper back 20 in the vehicle width direction is joined after being placed and a trough 42 behind the bracket package 41. The reinforcement outside portion 35 is joined to the trough 42.

The end of the trough 42 on the luggage room 60 side forms a vehicle width direction side opening edge 62 of the luggage room 60. The upper surface of the trough 42 is a side rain gutter portion (water flow surface) 42a that can be seen when a user opens the luggage door 70. The side rain gutter portion 42a is linked to the front rain gutter portion 32a of the upper back R/F 30, and rainwater or the like flowing through the front rain gutter portion 32a flows from the front rain gutter portion 32a into the side rain gutter portion 42a and flows rearward (downward) through the side rain gutter portion 42a. Then, the rainwater or the like flows from the rear end portion (lower end portion) of the side rain gutter portion 42a or to the lower back 90 and flows out of the vehicle.

The upper back 20 is made of a material different from the surrounding parts joined to the upper back 20. In other words, the upper back 20 is made of a material different from the upper back R/F 30, the side member S/A 40, and the room partition panel (not illustrated). Specifically, the upper back R/F 30, the side member S/A 40, and the room partition panel are made of iron (made of steel) and the upper back 20 is made of a material lighter than iron for vehicle weight reduction. For example, the upper back 20 is made of aluminum (aluminum alloy). Alternatively, the upper back 20 may be made of magnesium (magnesium alloy) or resin such as fiber reinforced plastic (FRP) and carbon fiber reinforced plastic (CFRP).

Since the material of the upper back 20 differs from the material of the upper back R/F 30, the side member S/A 40, and the room partition panel, the melting point of the upper back 20 differs from the melting point of the upper back R/F 30, the side member S/A 40, and the room partition panel. As a result, it is difficult to use spot welding in which base materials are melted and joined. Accordingly, joining between the upper back 20 and the upper back R/F 30, the side member S/A 40, and the room partition panel is performed by caulking joining, bolt joining, or rivet joining instead of spot joining. Merely the joining portions between the upper back 20 and the upper back R/F 30 are indicated by white circles in FIG. 1, and illustrated in FIG. 2 is a case where the upper back 20 and the upper back R/F 30 are joined to each other by caulking joining. The upper back 20 and each of the upper back R/F 30, the side member S/A 40, and the room partition panel are joined to each other in a plurality of places.

As illustrated in FIG. 1, the reinforcement outside portion 35 of the upper back R/F 30 is joined to the side member S/A 40 by spot welding. The spot welding is used because spot welding is possible as the upper back R/F 30 and the side member S/A 40 are made of the same iron (as the upper back R/F 30 and the side member S/A 40 are made of the same type of material). In FIG. 1, the joining portions between the reinforcement outside portion 35 and the side member S/A 40 are indicated by black circles.

As illustrated in FIG. 2, of the joining portions between the upper back 20 and the upper back R/F 30, the side member S/A 40, and the room partition panel, joining portions D between the upper back 20 and the front flange 31 of the upper back R/F 30, the side member S/A 40, and the room partition panel are covered with the interior material 110 and are places that a user cannot see. In contrast, rear side joining portions B, which are the joining portions between the upper back 20 and the rear flange 32 of the upper back R/F 30, are places that a user can see as the upper surface of the rear flange 32 is the front rain gutter portion 32a that can be seen when a user opens the luggage door 70. Accordingly, in order to improve the design of the vehicle rear portion structure 10, it is desirable that the rear side joining portion B is hidden when a user opens the luggage door 70. In the example of the disclosure, the rear side joining portion B is covered from above by the luggage weather rubber 50 provided at the opening edge of the luggage room 60.

The luggage weather rubber 50 is made of an elastically deformable soft resin. When the luggage door 70 is open, the luggage weather rubber 50 is not pushed by the luggage door 70 and undergoes no elastic deformation. When the luggage door 70 is closed, in contrast, the luggage weather rubber 50 is pushed by a seal surface 71a of a door inner 71 of the luggage door 70 and is elastically deformed.

As illustrated in FIG. 1, the luggage weather rubber 50 is provided continuously over the entire circumference of the opening of the luggage room 60. The luggage weather rubber 50 is attached to the luggage opening flange 34 of the upper back R/F 30 at the front side part thereof, attached to the trough 42 of the side member S/A 40 at each of both right and left side parts thereof, and attached to the lower back 90 at the rear side part thereof. As illustrated in FIG. 2, the luggage weather rubber 50 has an attachment portion 51 attached to the luggage opening flange 34 of the upper back R/F 30, the trough 42, and the lower back 90 and a lip 52 extending from the attachment portion 51 in a direction to enlarge the opening of the luggage room 60 (outer peripheral side).

In the cross-sectional view of the luggage weather rubber 50 (sectional view orthogonal to the longitudinal direction), the shape of the luggage weather rubber 50 is constant (including almost constant) over the entire circumference of the luggage weather rubber 50 and a length L of the lip 52 from the attachment portion 51 is constant (including almost constant) over the entire circumference of the luggage weather rubber 50. The length L of the lip 52 from the attachment portion 51 is equal to or greater than the length at which the lip 52 reaches a vehicle front side end B0 of the rear side joining portion B and is equal to or less than the length at which the lip 52 reaches the rear wall 33c of the bulging portion 33 in the vehicle width direction center portion of the opening edge 61 on the front side of the luggage room 60. As illustrated in FIG. 1, the rear side joining portions B provided in a plurality of places in the vehicle width direction are covered with the lip 52 of the luggage weather rubber 50.

How to determine the vehicle width direction position of the vehicle width direction end 24 of the upper back 20 will be described below.

In order to further improve the rigidity of the vehicle rear portion structure 10 by providing the upper back R/F 30, it is desirable that the rear side joining portion B is provided at a position close to a ridge line 33e on the rear side of the bulging portion 33. At least a corner portion 61a of the opening edge 61 on the front side of the luggage room 60 is curved rearward. Accordingly, in the corner portion 61a or the vicinity of the corner portion where the opening edge 61 on the front side of the luggage room 60 leaves the ridge line 33e rearward, a position is generated where it is impossible to cover and hide the rear side joining portion B with the lip 52 having the length L. The parting position (vehicle width direction end 24) of the upper back 20 is set between an outermost side joining portion B1 and an adjacent spot joining portion C1. Of the rear side joining portions B provided in a plurality of places in the vehicle width direction, the outermost side joining portion B1 is on the outermost side in the vehicle width direction that can be covered and hidden with the lip 52 having the length L. Of spot joining portions C between the reinforcement outside portion 35 and the side member S/A 40, the adjacent spot joining portion C1 is provided at a position that is not covered (cannot be covered) with the luggage weather rubber 50 at a position adjacent to the outermost side joining portion B1.

The operation and effect of the example of the disclosure will be described below.

(A) Since the upper back 20 is joined to the rear flange 32 as well as the front flange 31 of the upper back R/F 30, the upper back 20 is provided to extend rearward up to the opening of the luggage room 60 (including the vicinity of the opening of the luggage room). As a result, the weight reduction rate in a case where the upper back 20 is made of a material lighter than the material of the upper back R/F 30 can be maximized rearward unlike in a case where the upper back 20 is joined to the front flange 31 of the upper back R/F 30 without being joined to the rear flange 32.

(B) Since the rear side joining portion B, which is the joining portion between the upper back 20 and the rear flange 32 of the upper back R/F 30, is covered with the luggage weather rubber 50, the rear side joining portion B being seen when the luggage door 70 is open can be suppressed. Accordingly, even in a case where the upper back 20 is provided to extend rearward up to the opening of the luggage room 60, the design at a time when the luggage door 70 is open can be further improved.

(C) Since the rear side joining portion B is covered with the luggage weather rubber 50, a new part such as a garnish merely for covering and hiding the rear side joining portion B is unnecessary. Accordingly, unlike in a case where a new part is added, an increase in the number of parts can be further suppressed, which is advantageous in terms of cost.

(D) Since the rear side joining portion B is covered with the lip 52 of the luggage weather rubber 50, it is possible to cover the rear side joining portion B with a simple configuration as compared with a case where the rear side joining portion B is covered with the attachment portion 51 of the luggage weather rubber 50.

(E) Since the length L of the lip 52 from the attachment portion 51 in the cross-sectional view of the luggage weather rubber 50 is constant over the entire circumference of the luggage weather rubber 50, the luggage weather rubber 50 can be inexpensively manufactured as compared with a case where the length of the lip 52 is different.

(F) It is desirable that the opening of the luggage room 60 is large in view of improving the usability of the luggage room 60. Accordingly, it is desirable that the length of the rear flange 32 of the upper back R/F 30 in the front-rear direction is short, and the length is minimized in the vehicle width direction center portion of the opening edge 61 on the front side of the luggage room 60. In the example of the disclosure, the length of the lip 52 from the attachment portion 51 is set based on the vehicle width direction center portion of the opening edge 61 on the front side of the luggage room 60, that is, the part where the length of the rear flange 32 of the upper back R/F 30 in the front-rear direction is minimized and is equal to or greater than the length at which the lip 52 reaches the vehicle front side end B0 of the rear side joining portion B and equal to or less than the length at which the lip 52 reaches the bulging portion 33. Accordingly, across the entire vehicle width direction area of the upper back R/F 30, (i) it is possible to further suppress the lip 52 abutting against the bulging portion 33 of the upper back R/F 30 to be bent and cause a poor appearance and (ii) it is possible to further suppress the necessity of displacing the opening edge 61 on the front side of the luggage room 60 to the rear side of the vehicle in order to ensure a disposition space for the lip 52.

(G) Since the upper back R/F 30 is joined by spot welding to the vehicle body member (side member S/A 40) made of the same type of material as the upper back R/F 30 in the reinforcement outside portion 35, the joining place is not conspicuous and the design can be further improved unlike in a case where joining is performed by caulking joining, bolt joining, or rivet joining, which are joining methods for dissimilar materials.

(H) The vehicle width direction end 24 of the upper back 20 is between the outermost side joining portion B1, which is on the outermost side in the vehicle width direction among the plurality of rear side joining portions B, and the adjacent spot joining portion C1, which is provided at a position that is not covered with the luggage weather rubber 50 at a position adjacent to the outermost side joining portion B1 among the spot joining portions C between the reinforcement outside portion 35 and the side member S/A 40. Accordingly, the vehicle width direction end 24 of the upper back 20 can be set at the outermost side position where the rear side joining portion B can be covered with the luggage weather rubber 50. Accordingly, in a case where the rear side joining portion B is covered with the luggage weather rubber 50, the weight reduction rate in a case where the upper back 20 is made of a material lighter than the material of the upper back R/F 30 can be maximized in the vehicle width direction.

Although an embodiment has been described in detail above, the disclosure is not limited to the above-described embodiment, and various modifications or changes may be made within the scope of the gist of the present disclosure.

What is claimed is:

1. A vehicle rear portion structure comprising: an upper back; and an upper back reinforcement made of a material different from the upper back, the upper back reinforcement being provided to extend in a vehicle width direction on an upper side of a rear portion of the upper back in a vehicle front-rear direction, wherein: the upper back reinforcement includes a front flange, a rear flange behind the front flange in the vehicle front-rear direction, a bulging portion provided to bulge upward between the front flange and the rear flange, and a luggage opening flange provided to rise upward from a rear end portion of the rear flange in the vehicle front-rear direction and form an opening edge on a front side of a luggage room; luggage weather rubber is provided continuously over an entire circumference of the opening edge of the luggage room, and the luggage weather rubber is attached to the luggage opening flange; the upper back is joined to the front flange of the upper back reinforcement at an intermediate portion of the upper back in the vehicle front-rear direction by any of caulking joining, bolt joining, and rivet joining and is joined to the rear flange of the upper back reinforcement at a rear end portion of the upper back in the vehicle front-rear direction; and a rear side joining portion as a joining portion between the upper back and the rear flange of the upper back reinforcement is covered with the luggage weather rubber.

2. The vehicle rear portion structure according to claim 1, wherein:
the luggage weather rubber includes
an attachment portion attached to the luggage opening flange of the upper back reinforcement, and
a lip extending from the attachment portion in a direction to enlarge an opening of the luggage room; and
the rear side joining portion is covered with the lip of the luggage weather rubber.

3. The vehicle rear portion structure according to claim 2, wherein a length of the lip extending from the attachment portion in a cross-sectional view of the luggage weather rubber is constant over an entire circumference of the luggage weather rubber.

4. The vehicle rear portion structure according to claim 3, wherein the length of the lip extending from the attachment portion is equal to or greater than a length at which the lip reaches a vehicle front side end of the rear side joining portion and is equal to or less than a length at which the lip reaches the bulging portion in a vehicle width direction center portion of the opening edge on the front side of the luggage room.

5. The vehicle rear portion structure according to claim 1, wherein:
the upper back reinforcement includes reinforcement outside portions which is provided at both end portions of the upper back reinforcement, and which is outside of ends of the upper back in the vehicle width direction; and
the upper back reinforcement is joined by spot welding to a vehicle body member made of the same type of material as the upper back reinforcement at the reinforcement outside portion of the upper back reinforcement.

6. The vehicle rear portion structure according to claim 5, wherein:
a plurality of the rear side joining portions covered with the luggage weather rubber is provided in the vehicle width direction; and
an end of the upper back in the vehicle width direction is between an outermost side joining portion on an outermost side in the vehicle width direction among the rear side joining portions and an adjacent spot joining portion provided at a position not covered with the luggage weather rubber, the position being adjacent to the outermost side joining portion in the vehicle width direction among spot joining portions between the reinforcement outside portion and the vehicle body.

* * * * *

UNITED STATES PATENT AND TRADEMARK OFFICE
CERTIFICATE OF CORRECTION

PATENT NO. : 10,745,063 B2  
APPLICATION NO. : 16/193662  
DATED : August 18, 2020  
INVENTOR(S) : Toshinobu Takashi Page 1 of 1

It is certified that error appears in the above-identified patent and that said Letters Patent is hereby corrected as shown below:

On the Title Page

Item (72), inventor 1, city, delete "Nisshin" and insert --Nisshin-shi Aichi-ken--, therefor.

Signed and Sealed this  
Fifth Day of January, 2021

Andrei Iancu  
*Director of the United States Patent and Trademark Office*